(12) United States Patent
Uffenkamp et al.

(10) Patent No.: US 8,254,666 B2
(45) Date of Patent: Aug. 28, 2012

(54) METHOD FOR THE DETERMINATION OF THE WHEEL GEOMETRY AND/OR AXLE GEOMETRY OF MOTOR VEHICLES

(75) Inventors: Volker Uffenkamp, Ludwigsburg (DE); Guenter Nobis, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 953 days.

(21) Appl. No.: 11/909,386

(22) PCT Filed: Apr. 11, 2006

(86) PCT No.: PCT/EP2006/061521

§ 371 (c)(1),
(2), (4) Date: Sep. 21, 2007

(87) PCT Pub. No.: WO2006/133982

PCT Pub. Date: Dec. 21, 2006

(65) Prior Publication Data

US 2008/0319706 A1    Dec. 25, 2008

(30) Foreign Application Priority Data

Apr. 15, 2005 (DE) .......................... 10 2005 017 624

(51) Int. Cl.
*G06K 9/00* (2006.01)
(52) U.S. Cl. ........ 382/154; 382/100; 382/103; 382/181; 702/150; 356/139.09
(58) Field of Classification Search .................. 382/100, 382/103, 104, 106, 107, 154, 181, 209; 702/150; 356/139.09
See application file for complete search history.

(56) References Cited

U.S. PATENT DOCUMENTS 5,827,964 A * 10/1998 Douine et al. .................. 73/466
(Continued)

FOREIGN PATENT DOCUMENTS

DE        197 57 763        7/1999
(Continued)

OTHER PUBLICATIONS

Mecke R et al: "3-D Motion and Shape From Mulitple Image Sequences" 3-D Digital Imaging and Modeling, 2003. 3DIM 2003. Proceedings. Fourth International Conference on Oct. 6-10, 2003, Piscataway, NJ, USA, IEEE, Oct. 6, 2003 , pp. 155-162, XP010662690, ISBN: 0-7695-1991-1.

*Primary Examiner* — Matthew Bella
*Assistant Examiner* — Eric Rush
(74) *Attorney, Agent, or Firm* — Michael J. Striker

(57) ABSTRACT

The invention relates to a method for determining the wheel geometry and/or axle geometry of motor vehicles by means of an optical measuring apparatus. According to said method, at least two recording points are assigned to each other and are referenced in relation to the measuring space with the aid of an image recording system, optionally taking into account reference characteristics and vehicle body characteristics, an object segment (6) comprising the wheel (5) that is to be measured is detected from different perspectives, and the position of wheel characteristics in the measuring space is evaluated during the measurement. In order to create an advantageous procedure regarding the operation and the accuracy of the measurement, a plurality of individual 3D pixels representing the three-dimensional surface of the object segment that is detected by the at least two image recording devices (2) are determined from the object segment using image processing methods by correlating images, and the wheel characteristics and/or reference characteristics and/ or vehicle body characteristics are obtained therefrom.

7 Claims, 8 Drawing Sheets

U.S. PATENT DOCUMENTS

| | | | |
|---|---|---|---|
| 6,341,013 B1 * | 1/2002 | Battiti et al. | 356/139.09 |
| 6,397,164 B1 * | 5/2002 | Nobis et al. | 702/150 |
| 6,404,486 B1 | 6/2002 | Nobis et al. | |
| 6,710,866 B1 | 3/2004 | Adolph | |
| 6,894,771 B1 * | 5/2005 | Dorrance et al. | 356/139.09 |
| 7,088,442 B2 * | 8/2006 | Hassler et al. | 356/237.1 |
| 7,120,524 B2 * | 10/2006 | Srack et al. | 701/33 |
| 7,158,665 B2 * | 1/2007 | Arima | 382/154 |
| 7,199,873 B2 * | 4/2007 | Braghiroli | 356/139.09 |
| 7,230,694 B2 * | 6/2007 | Forster et al. | 356/139.03 |
| 7,257,249 B2 * | 8/2007 | Farsaie | 382/154 |
| 7,336,350 B2 * | 2/2008 | Dorrance et al. | 356/139.09 |
| 7,355,687 B2 * | 4/2008 | Voeller et al. | 356/139.09 |
| 2004/0105580 A1 * | 6/2004 | Hager et al. | 382/154 |
| 2006/0042380 A1 * | 3/2006 | Douglas et al. | 73/460 |

FOREIGN PATENT DOCUMENTS

| | | |
|---|---|---|
| DE | 199 34 864 | 2/2001 |
| DE | 100 50 653 | 5/2002 |
| EP | 0 895 056 | 2/1999 |
| EP | 1 042 643 | 10/2000 |
| JP | 2002-500342 | 1/2002 |
| JP | 2002-188917 | 7/2002 |

* cited by examiner

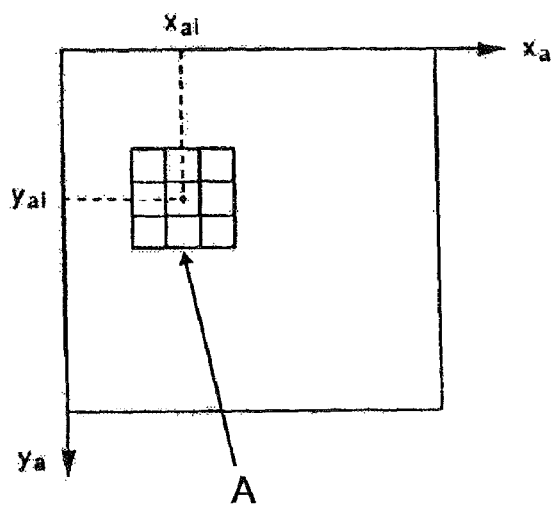
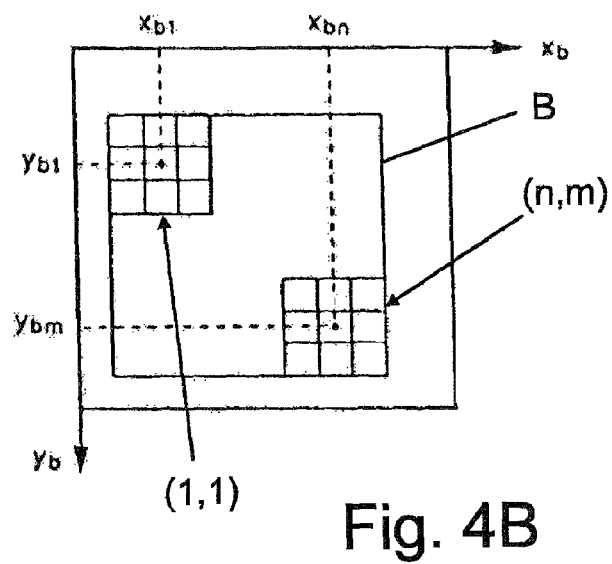
Fig. 4A  Fig. 4B
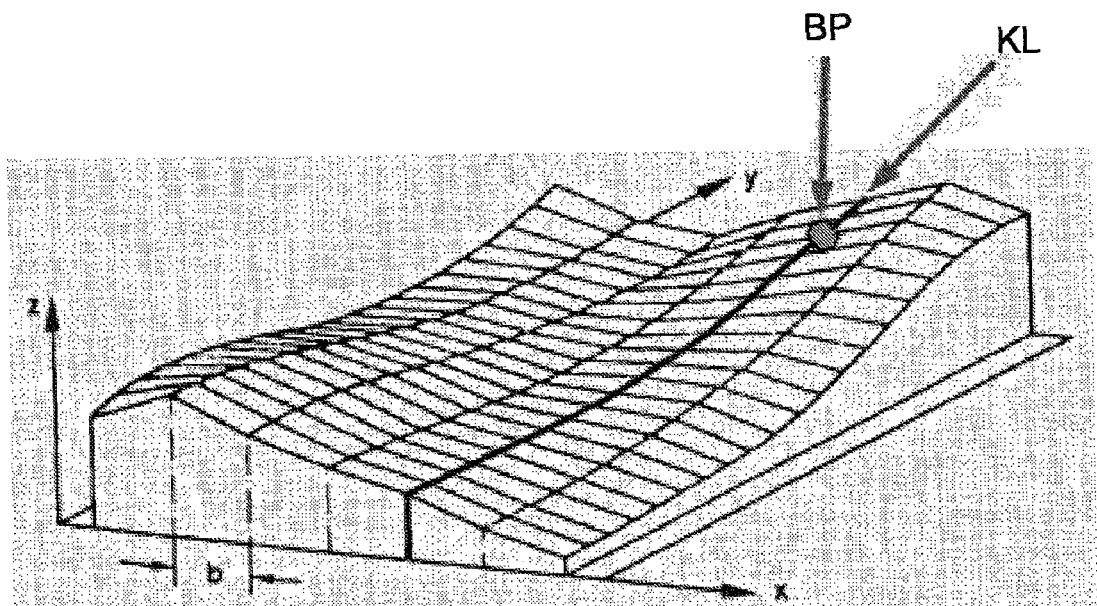
Fig. 5

METHOD FOR THE DETERMINATION OF THE WHEEL GEOMETRY AND/OR AXLE GEOMETRY OF MOTOR VEHICLES

BACKGROUND OF THE INVENTION

The present invention relates to a method for determining the wheel geometry and/or axle geometry of motor vehicles using an optical measuring device, with which—while optionally taking into account reference features and vehicle body features—an image recording system that includes at least two image recording devices for creating digital images is used to assign at least two recording points to each other and perform referencing relative to the measurement space, an object section including the wheel to be measured is registered from different perspectives, and the position of wheel features in the three-dimensional measurement space is evaluated in the measurement.

A method of this type is described in DE 197 57 763 A1 and EP 1 042 643 B1. Using these known methods, the axis of motion, and data on the wheel geometry and axle geometry are ascertained with the aid of image recording devices—cameras, in particular—a reference feature system at the test station, and optical features on the motor vehicle and the vehicle body. According to DE 197 57 763 A1, the measurement is carried out with the vehicle at a standstill. According to EP 1 042 643 B1, however, the motor vehicle is driven past the measurement device with the image recording system. Based on a detection of the motor vehicle and the reference feature system, the measuring device references the system in the measurement space relative to the measurement station. Features that have been applied intentionally in the reference feature system (for referencing the measurement device), features on the wheel or wheels to be measured and on the vehicle body, and existing features are utilized to carry out the methods. Additional effort is required to adapt special features on the wheel and the vehicle body and in the reference feature system, but doing so is advantageous because it allows the features to be ascertained unambiguously, thereby resulting in a high level of measurement accuracy. The method is enhanced, however, by the fact that this known measurement device allow features to be applied to the vehicle body and the wheel, in particular, that do not need to be adjusted, and that are lightweight.

The highly accurate determination of the wheel geometry and axle geometry of motor vehicles is becoming increasingly significant as suspension technology continues to improve. New and more finely tuned methods for adjusting toe and camber of individual wheels require that the measurement device be highly accurate. Measurement devices that require laborious installation and adjustment of the measurement device on the wheel for use with the methods described above are widespread.

Further methods have been developed based on the publications listed above, as described, e.g., in DE 199 34 864 A1 and DE 100 50 653 A1. While the former publication presents, e.g., a special method for determining the axis of motion of the motor vehicle based on a trajectory of at least one vehicle body feature, more detailed explanations of various procedures are described in DE 100 50 653 A1 for referencing the measurement device with the measurement station, and assigning the recording locations to each other (via position and direction, also referred to as orientation).

Publication EP 0 895 056 A2 describes the use of structures present on the motor vehicle anyway, particularly the edge of the rim, for measuring the axis. To determine the 3D position and the position of the wheel plane, the position of the plane of the rim edge is derived from the two images taken by two cameras by identifying the rim edge in a single image of a pair of images based on a processing of maximum gray-value transitions of several significant features of the rim edge and, based on this, calculating the ellipse using five points on the rim edge that was depicted. A procedure of this type, which is known per se from image processing, with which edges are ascertained based on abrupt gray-value transitions, makes it difficult to obtain an accurate measurement of the geometric data. It also creates problems associated with avoiding disturbing influences caused by changing illumination situations.

The object of the present invention is to provide a method of the type described in the preamble, with which exact measurement results of the wheel geometry and/or axle geometry are obtained with a minimum of adjusting effort and without the need to make additional adaptations for measurement marks.

SUMMARY OF THE INVENTION

It is provided that the wheel features and/or reference features and/or vehicle body features are ascertained using image processing methods by correlating images in the three-dimensional (3D) object space. A 3D group of points is ascertained, which represents the three-dimensional object surface in the object section registered two-dimensionally from different perspectives using the at least two image recording devices. It is possible ascertain the features as a point, a 2D function, a 3D function, or a 3D surface, individually or in combination of at least two of these measures.

Although the fact that a single 3D surface point ascertained from a group of points typically results, per se, in a less reliable detection than does a feature applied intentionally for the measurement must be put up with, a large number of 3D surface points may be obtained using appropriate algorithms without performing any additional adaptation steps, and they may be used in the evaluation. The fact that they are less accurate individually may be compensated for by using a type of averaging or a suitable fitted function or a suitable surface model, in particular when powerful computers and, e.g., integrated processors are used for image processing. This results in a simple design and simple handling of the measurement device, because, e.g., there is no limitation on the material of which the vehicle body is made, such as sheet metal, aluminum or plastic, nor is it necessary to remove wheel covers or perform any additional adaptation work. Once the wheel features have been ascertained, the wheel geometry and/or the axle geometry can be determined using the evaluation device, e.g., as described in greater detail in the publications mentioned initially in this regard. The wheel feature can be composed of a single 3D surface point or an average of several 3D surface points that belong together locally, or of functional parameters (e.g., maximum value or chord, or the like) obtained using a fitted function across several 3D surface points that belong together locally, or, from the surface model, it can be composed of functional parameters obtained from 3D surface points that belong together locally. The wheel features result from an analysis of 3D surface points based on a localized reference point, as a line of intersection through a reference point or as a local surface region around a reference point. The reference points are used as the basis for the evaluation. The reference points can be specified in an optimized manner in terms of number and position, depending on the particular measurement requirement and evaluation characteristics for the wheel features (point, 2D function, 3D function/surface), e.g., depending on the type of motor vehicle or wheel.

To carry out the method, various advantageous procedures involve using the information provided by the 3D group of points directly to extract the wheel features, or to first derive a surface model from the 3D group of points via an intermediate step, and then, in a subsequent, second step to extract the wheel features from the surface model. The surface model can be designed, e.g., as a contour model, a regular grid, or as triangulation.

In determining the wheel geometry and/or axle geometry, it is also advantageous to ascertain vehicle body features, as also described in the publications mentioned initially. In this regard, the method is simplified by the fact that at least one key vehicle body feature is ascertained in addition to the wheel features in the same manner, using the methods of image processing with correlation of images. The accuracy can also be increased in this case using a correspondingly increased number of features.

In conjunction with the determination of the wheel geometry and/or axle geometry as the motor vehicle is driven past the image recording devices, in particular, further advantageous measures involve extracting the at least one vehicle body feature, which is used to determine the axis of motion based on the motion of the motor vehicle, and extracting the wheel features of the wheel to be measured, out of the 3D surface structure of the image sections that were ascertained. Specifically, it is hereby provided that the determination of the wheel geometry and/or axle geometry is carried out when the motor vehicle drives past the image recording devices; the motion of the motor vehicle relative to the image recording devices and the reference features is determined based on the at least one vehicle body feature, and at least one wheel feature of the wheel to be measured is extracted from the surface structure of the detected object section at several or all image recording instants as the vehicle passes by.

With regard for the accuracy and reliability of the measurement, it is also significant that the wheel to be measured is checked in the evaluation device for rim runout with reference to the rim runout of at least three wheel features, and the rim runout is taken into account in the future evaluation, if necessary. These significant wheel features are ascertained using the method for extracting wheel features described above. Based on the significant wheel feature (e.g., the valve), the angular position of the at least two other wheel features can be determined at any point in time during the measurement. Strictly speaking, the angular position is based on the reference point of the applicable wheel feature.

Operation is simplified and the measurement is carried out without interruption due to the fact that the recording locations are assigned to each other and the image recording devices are referenced to the measurement space based on an additional reference feature system installed in the measurement space and/or based on reference features obtained from key structures present anyway in the measurement space, using the image processing methods stated in claim 1.

The referencing process can be carried out before the measurement is actually carried out on the motor vehicle or during the measurement, although the visibility of the reference features may be limited to a certain extent because they are optically obscured by the motor vehicle. Despite the limited visibility during the measurement of the motor vehicle, the referencing can be monitored during the measurement procedure using the reference features that are still visible.

A further possibility for carrying out the method and ascertaining features under difficult lighting or illumination conditions (e.g., insufficient contrast or disturbing reflections) is to project patterns on the wheel, vehicle body, and/or in the measurement space using a projector, in order to ascertain the wheel features and/or the at least one vehicle body feature and/or the reference features. With regard for the projectors, a distinction is made between those with defined patterns (e.g., circles or crosses) or with random patterns (gray-value patterns with stochastic distribution), and between projectors with or without a defined assignment to the camera or cameras. With these measures, the detection of low-contrast surfaces and/or the contrast ratios are/is improved when lighting is unfavorable.

Evaluation is simplified and the quantity of data is reduced by reducing the amount of data taken into account in the evaluation, by eliminating the image points of uninteresting image regions that were recorded, either before the 3D group of points is ascertained from the 2D image points, or after the 3D group of points is ascertained from the 3D image points.

Further advantageous measures are to produce a partially different density and/or a partially different grid in the 3D group of points and/or in the three-dimensional surface model before the wheel and/or vehicle body features are extracted, and to supply the image processing device with preliminary information about the wheel to be measured, such as the tire diameter and/or the rim diameter and/or the position of the valve.

BRIEF DESCRIPTION OF THE DRAWINGS

The present invention is explained in greater detail below using exemplary embodiments, with reference to the drawings.

FIG. 4 shows a schematic depiction in sub-figure a) of the determination of a sample matrix A in a first digital image and, in sub-figure b) its positioning in a second digital image at various positions (1, 1) and (n, m), FIG. 5 shows an example of a 3D surface model with a regular grid.

DETAILED DESCRIPTION OF THE EXEMPLARY EMBODIMENT

Figure 1:
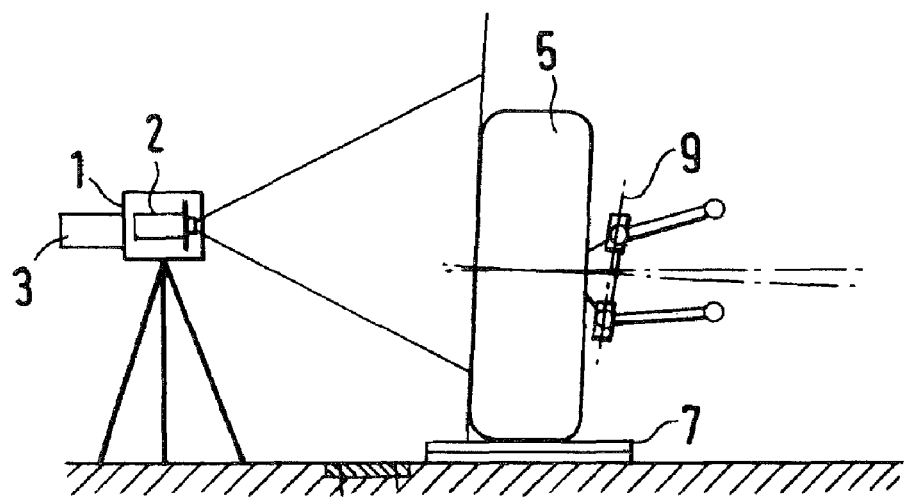
FIG. 1 shows a system for determining the wheel geometry and axle geometry as viewed in the longitudinal direction of the motor vehicle.
Figure 2:
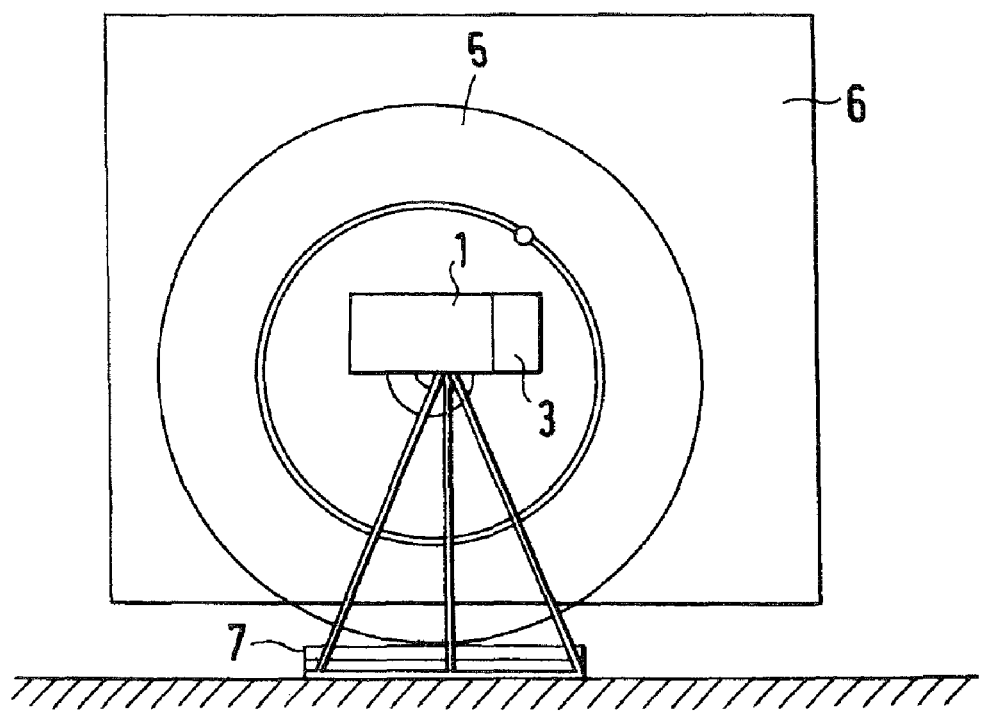
FIG. 2 shows a system according to FIG. 1, in a side view.
Figure 3:
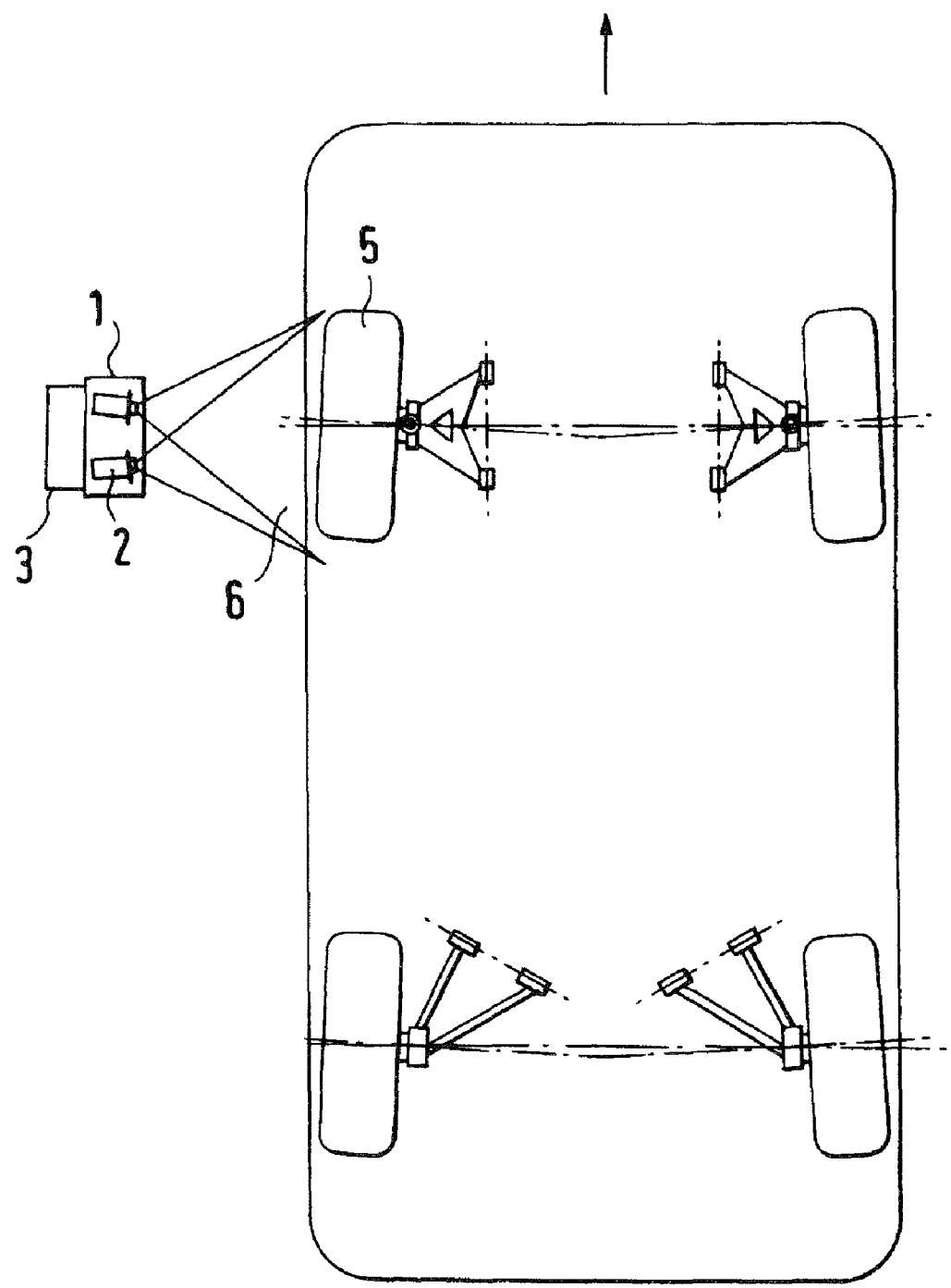
FIG. 3 shows a larger section of a system according to FIGS. 1 and 2, in a top view.

FIG. 1 shows a system for determining the wheel geometry and/or axle geometry of motor vehicles as viewed in the longitudinal direction of the vehicle, with a measurement head 1 mounted, e.g., on a stand. Measurement head 1 includes, e.g., two image recording devices 2 in the form of cameras (see also FIG. 3) and an evaluation device 3. The viewing field of the camera is directed toward an object section 6 that includes at least a portion of motor vehicle wheel 5, and the viewing fields of both cameras overlap, at least to a large extent. In this case, motor vehicle wheel 5 coupled with a steering axis 9 rests on a rotary platform 7 located at the measurement station. FIG. 2 shows the same system in a side view. As shown in FIG. 3 in particular, object section 6 is recorded by the two cameras 2, from different perspectives.

To measure the three-dimensional object geometries—i.e., in this case, in object section 6 with motor vehicle wheel 5 to be measured and surrounding regions of the motor vehicle—from different perspectives, the relationship between the recording locations of the image recording devices or cameras 2 must be known, in terms of position and direction (also referred to as orientation). With a measuring device with two or more image recording devices 2 related to each other in a fixed manner, image recording devices 2 may be related to each other, e.g., at the plant or at the test station (measurement station) by using them to register a reference feature system.

A further task performed by the reference feature system is referencing, i.e., defining an unambiguous reference of the measuring device to the test station, e.g., to unambiguously identify the plane on which the vehicle is standing or driving, and/or a plane perpendicular thereto, and to determine the wheel geometry and/or axle geometry with reference thereto, as also explained in the publications named above.

The assignment of the recording locations of image recording devices 2 to each other and the referencing of the measuring device to the test station may be carried out independently of the vehicle measurement itself, i.e., these tasks may be carried out in advance. If a reference feature system has been installed at the test station or in the measurement space in order to perform referencing, it may be removed from the test station after the recording locations have been assigned to each other and the referencing hase been carried out. The determination of the wheel geometry and/or axle geometry is improved as a result, because this ensures that the vehicle cannot become obscured during the actual measurement, and the measurement device may be optimized in terms of the object section, depth of field, and lateral magnification. In addition, the detection and evaluation in this phase of the measurement is limited to the features of the motor vehicle.

If a structured environment exists in the area where the measurement device records, then the tasks of installing and removing a reference feature system on-site may be eliminated partially or entirely by registering the surface geometry of the measurement environment using image recording devices 2 of the image recording system, and the surface geometry may be advantageously determined using the method of correlating images. Based thereon, characteristic reference features may be obtained, in order to assign and/or reference the measurement device.

The determination of three-dimensional surface geometries using identical points in two-dimensional, digital images recorded separately is known per se as the correlation of images, from photogrammetry. According to FIG. 4, when images are correlated in the first two-dimensional digital image (sub-figure A)), a sample matrix A is defined, and, in the second two-dimensional digital image (sub-figure B)), a search matrix B is defined, and it is typically larger. Then, the correlation coefficients (r) are determined for all possible positions (n, m) of the sample matrix within the search matrix. The maximum value of the correlation coefficient defines the most likely position of sample matrix A at the particular point in search matrix B. Based on the position of the sample matrix—determined in this manner—in the two individual images, a 3D surface point is determined using photogrammetric methods known per se. The sum of all 3D surface points obtained in this manner is referred to as a 3D group of points.

Based on this 3D group of points and using the methods described above as examples, it is also possible to derive a three-dimensional surface model having a predefined or predefinable grid, as shown in FIG. 5 as an example; x, y, and z are the spacial coordinates. A 2D fitted function is drawn as a bold contour line KL, and a reference point BP for a wheel feature is indicated.

Depending on the level of precision desired or required, more or less computing effort may be used to ascertain the features, and it is also possible to determine fine surface structures exactly, e.g., the features may be ascertained in a partially limited manner by using a higher density of the 3D group of points, and/or by using a smaller grid of the surface model. Conversely, in areas of the object section that are unimportant in terms of ascertaining wheel features, reference features and/or vehicle body features, it is possible to use a lesser density of the 3D group of points and/or a coarse grid of the surface model.

Figure 6A:
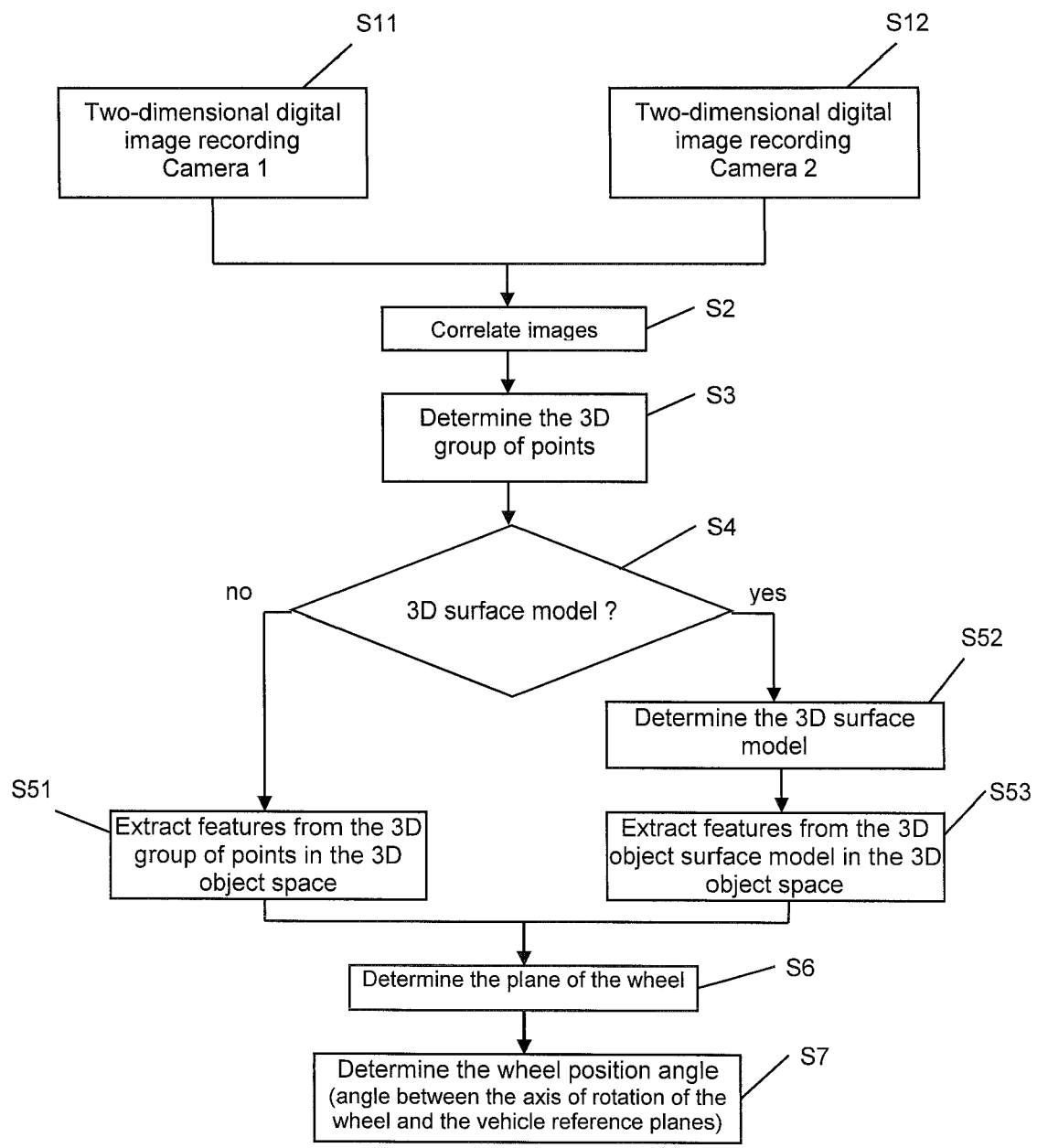
FIGS. 6A through 6D show flow charts of various method sequences, based on the example of determining a wheel position angle.
Figure 6B:
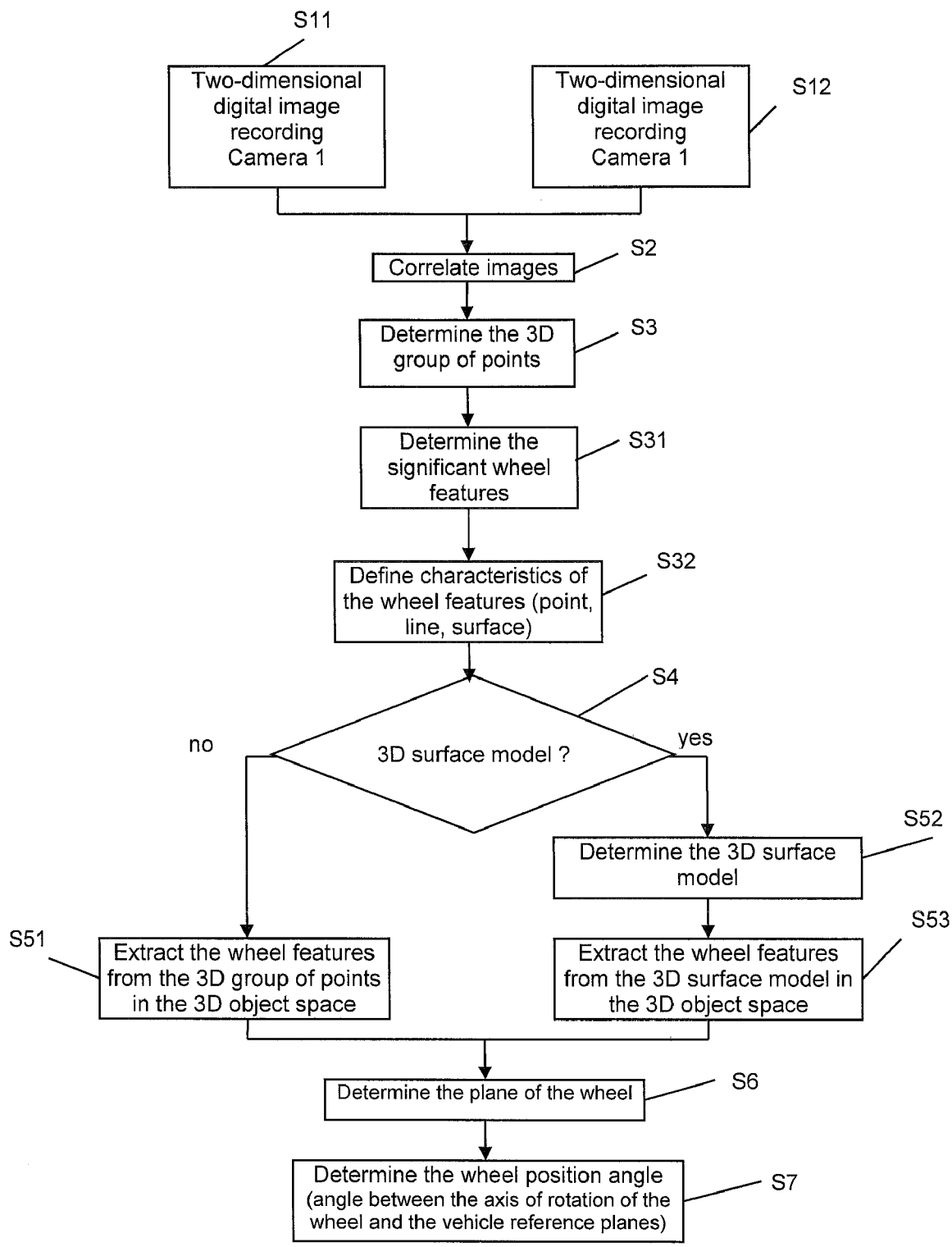
Figure 6C:
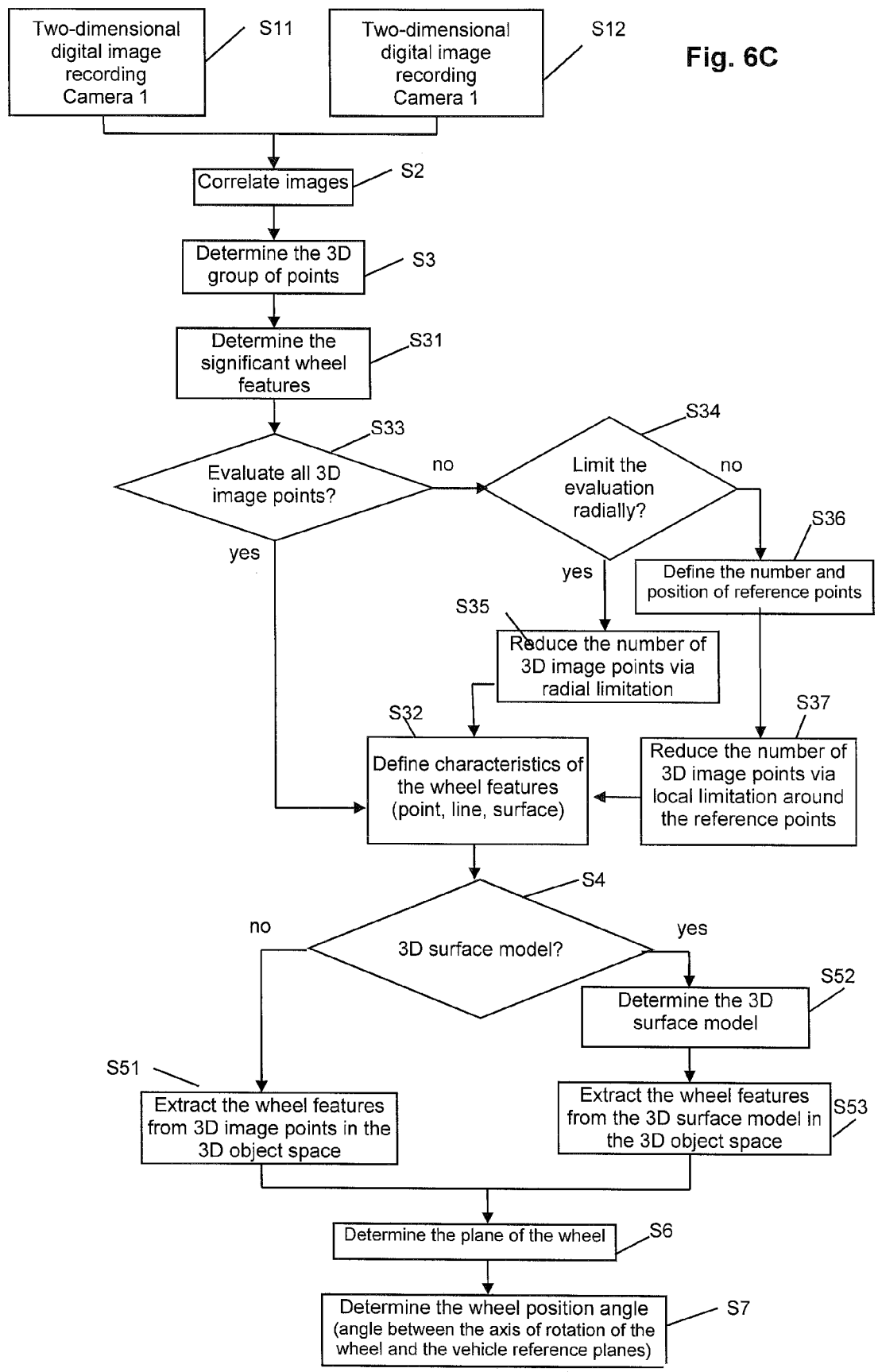
Figure 6D:
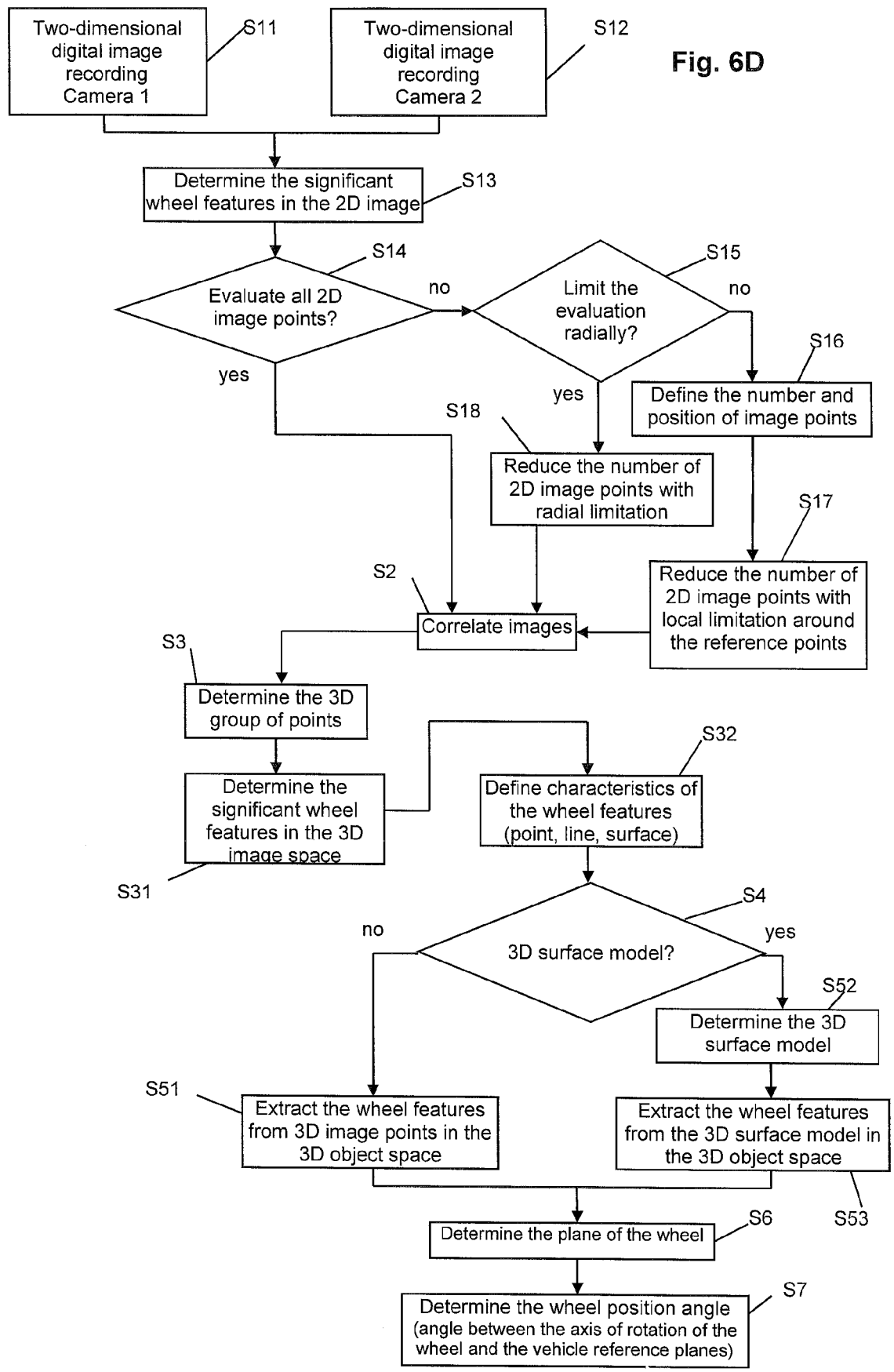

FIGS. 6A through 6D depict the process of image processing and feature extraction up to the determination of the wheel position angle, in the form of flow charts. Various embodiments of the process are shown in FIGS. 6B through 6D. It is clear that, in terms of the evaluation method, the methods of correlating images are much different from the methods—which are also known in image processing—for ascertaining contour lines or edges based on abrupt gray-scale transitions in two-dimensional images recorded individually.

According to the methods of image correlation described, the relevant features are not extracted in the two-dimensional image (as described, e.g., in EP 0 895 056), but rather in the three-dimensional object space. This results in clear advantages, e.g., in the form of less disturbing interference caused by changing illumination and light conditions, and with regard for the level of accuracy attainable under normal shop conditions.

According to FIG. 6A, the first and second two-dimensional digital images are recorded with the first and second cameras, in a first step S11 and S12. In step S2, the image correlation is carried out, then the 3D group of points is ascertained, in step S3. In step S4, a query is carried out in evaluation device 3 as to whether a 3D surface model should be created. If a surface model should be created, the 3D surface model is created in step S52, and the features are extracted from the 3D surface model in the 3D object space in step S53. If the answer to the query in step S4 is that a surface model should not be created, the features are extracted from the 3D group of points in the 3D object space in step S51. After the features are extracted, after steps S53 and S51, a further step is carried out, step S6, in which the wheel plane is determined and, based thereon, in step S7, the wheel position angle is determined, i.e., the angle between the particular wheel plane and the motor vehicle reference planes.

With the procedure depicted in FIG. 6B, in contrast to the process depicted in FIG. 6A, after the 3D group of points is determined in step S3, additional steps are carried out, steps S31 and S32, in which the significant wheel features are determined and the characteristics of the wheel features are defined (point, 2D function, 3D function/surface). The significant wheel feature is an unambiguously recognizable feature, e.g., valve V, based on which the location of the remaining wheel features may be unambiguously determined. The characteristic wheel features may be defined in a suitable manner for optimal detection and evaluation.

A further embodiment of the process is shown in FIG. 6C. Compared with the procedure depicted in FIG. 6B, a step S33 is provided here after step S31, in which a query is made as to whether all 3D image points should be evaluated. If all 3D image points should be evaluated, the process jumps to step S32, in which the characteristics of the wheel features are defined as they are in FIG. 6B. If all 3D image points should not be evaluated, a further query is made in step S34 as to whether the evaluation should be limited radially. If a radial limitation should be carried out, the number of 3D image points is limited radially, and therefore reduced. Finally, the process moves to step S32. If an evaluation with radial limitation should not be carried out, the number and position of reference points BP is defined in step S36 and, in step S37, the number of 3D image points is reduced with local limitation around reference points BP. The process then moves to step S32, and the process continues as depicted in FIGS. 6B and 6A. Performing radial limitation to reduce the number of 3D image points is only one possibility. Other possibilities are, e.g., to limit by sector (see FIGS. 7C and 7D), or to limit locally around reference points, as described.

As an alternative, as shown in FIG. 6D, pre-processing with limitation of the number of image points based on the 2D images themselves may be carried out. To this end, after the image is recorded by cameras 1 and 2 (steps S11, S12), the significant wheel features are determined in the 2D image (step S13), then a query is made in step S14 as to whether all 2D image points should be evaluated. If not, the process moves to step S2 in FIG. 6B, and the process continues as shown in FIG. 6B. If all 2D image points should not be evaluated, a query is made in step S15 as to whether the evaluation should be limited radially. If so, a radial limitation is carried out and, therefore, the number of 2D image points is reduced in step S18. The process then continues with image correlation S2 and the subsequent steps. If an evaluation with radial limitation should not be carried out, the number and position of reference points BP is defined in step S16 and, in step S17, the number of 2D image points is reduced with local limitation around reference points BP. The process then continues with step S32 and the subsequent steps. The limitation of the evaluation in the radial direction should be regarded as an example, and limitation by sector would be another possibility.

Figure 7A:
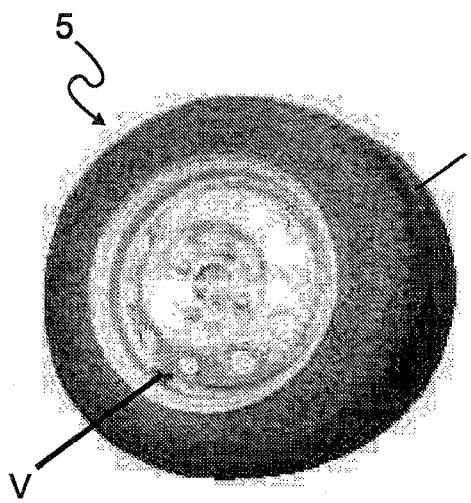
FIGS. 7A through 7F show images that are used to ascertain wheel features by determining a 3D group of points and to ascertain a wheel plane and/or an axis of rotation of a wheel.
Figure 7B:
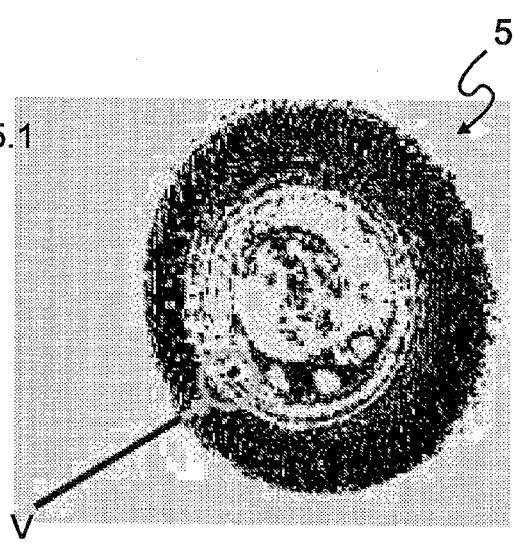
Figure 7C:
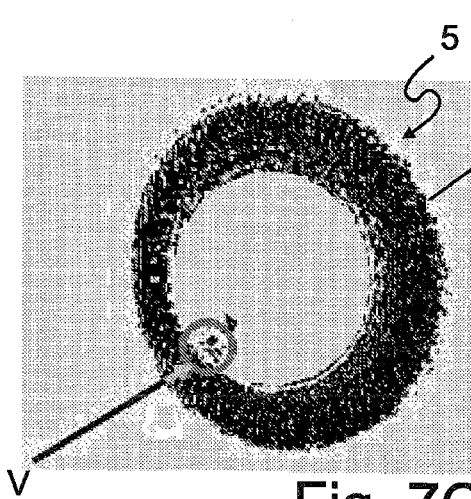
Figure 7D:
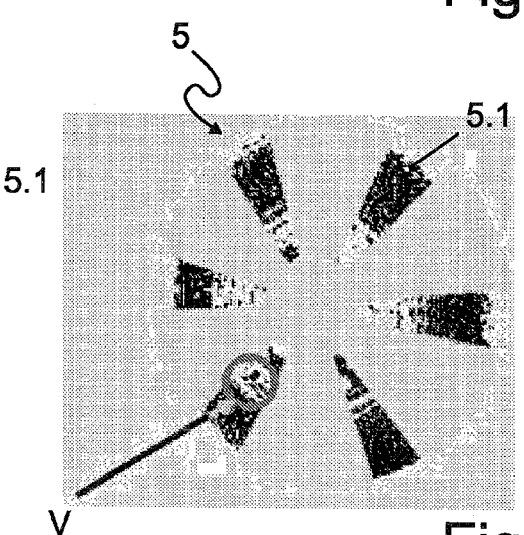
Figure 7E:
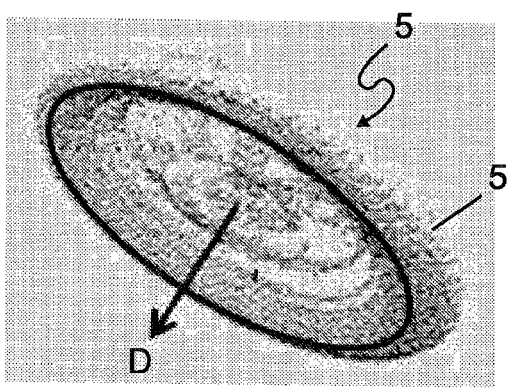
Figure 7F:
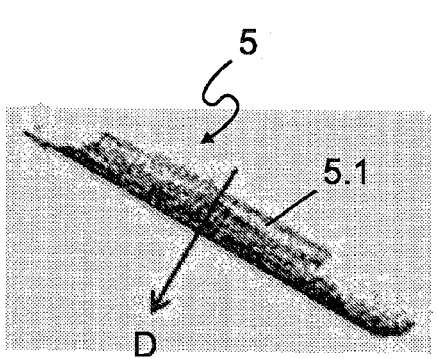

FIGS. 7A through 7F show how wheel features are ascertained and how wheel plane E and the axis of rotation of the wheel perpendicular thereto are ascertained using a pictographic reproduction. The two-dimensional digital image of a wheel 5 with tire 5.1 and valve V depicted in FIG. 7A is used to generate a 3D group of points of wheel 5, as shown in FIG. 7B. Valve V is also shown. The wheel features may then be extracted from the 3D group of points. Valve V is a significant, unambiguously recognizable feature of the wheel. In FIGS. 7C and 7D, the regions of the 3D group of points to be evaluated are limited radially and by sector. In FIG. 7C, the center region of the hub is eliminated. In FIG. 7D, individual sectors and an uninteresting central region—that is, regions in which no wheel features should be ascertained—are eliminated. Valve V, as a significant feature, is still shown. FIGS. 7E and 7F show the determination of the normal vector of wheel 5 and the direction of the axis of rotation D of the wheel and, perpendicular thereto, wheel plane E, in three-dimensional space.

Wheel features of the outer contour of the side wall of the tire are employed for this purpose, for example. It is also possible to use other wheel features that were ascertained, including the combination of several different wheel features. The depiction of wheel 5 obtained in this manner is shown tilted relative to the plane of the drawing in FIG. 7E. In FIG. 7, the depiction of the wheel is rotated such that axis of rotation D lies in the plane of the depiction and, therefore, wheel plane E is perpendicular to the plane of the image.

As for the rest, the following measures are provided for determining the wheel geometry and/or axle geometry of a motor vehicle, as described, e.g., in the publications named above: Before the measurement is performed on the motor vehicle, the reference planes are ascertained from the reference features detected, for use in referencing the image recording systems. While the measurement is being carried out on the motor vehicle, a self-check of the referencing of the measurement system is carried out based on reference features that are not obscured by the motor vehicle. Wheel plane E is determined from the wheel features that were ascertained and the wheel position angles that were determined based on the relation of wheel plane E to the reference planes. Advantageously, wheel plane E is determined via the sum of the at least one wheel feature that was ascertained and the at least one vehicle body feature out of several images that were recorded as the motor vehicle was driven past.

If the resolution of camera 2 is not high enough to ensure high measurement accuracy, the resolution may be increased by using suitable methods of image processing—which are known per se—to perform evaluations in the sub-pixel range.

To measure the wheel geometry and axle geometry, the three-dimensional surface structure of wheel 5 may therefore be utilized; it is defined based on characteristic components, such as the tire, rim, wheel cover, or the valve. The surface geometry is determined, as described above, using image processing methods and correlation of images. A 3D group of points is ascertained from the object section recorded from different positions using at least two cameras. The 3D group of points spacially depicts a three-dimensional surface of object structures present in the object section using a large number of 3D image points. Based on the 3D group of points, a 3D surface model may be described using various methods, e.g., using a contour model, triangulation, or a regular grid. Based on the 3D group of points and/or at least one of the three-dimensional surface models listed as examples, it is then possible to ascertain characteristic vehicle body and wheel features, and the reference features.

The symmetry of a wheel 5 and the rotation of every wheel point around the axis of rotation of the wheel make is easier to ascertain the relevant wheel plane E and/or the axis of rotation of the wheel D, which are required to determine tow and camber. Significant surface features on the wheel, such as the valve, hole pattern, labeling, and other features such as dirt and damage may be detected. This also makes it possible to detect rim runout, if present, and to take it into consideration.

If a measurement is carried out as the motor vehicle is driven past, the motion of the vehicle body relative to the measurement device and the reference features is also determined. To this end, the determination of the 3D group of points and the 3D surface model is expanded to include the wheel well around the wheel. This represents only a slight change in the procedure, since the entire object section is ascertained three-dimensionally anyway at the beginning of the measurement, because wheel 5 to be measured has a position in the object space that is not known in advance, due to the different types of motor vehicles and rim sizes. It must therefore be extracted from the 3D structure of the entire scene that was recorded.

What is claimed is:

1. A method for determining a wheel geometry and/or axle geometry of motor vehicles using an optical measuring device, comprising the following steps:
providing an image recording system that includes at least two image recording devices (2) for creating digital images;
using said image recording system to assign at least two recording points to each other and perform referencing relative to a three-dimensional measurement space while taking into account reference features;

registering an object section (6) including a wheel to be measured from different perspectives; and evaluating a position of wheel features in the three-dimensional measurement space, wherein a 3D group of points is ascertained from the object section registered two-dimensionally by the at least two image recording devices (2) from different perspectives using image processing methods with correlation of images, wherein the 3D group of points represent a three-dimensional surface of the object section with several individual 3D image points, and wherein the wheel features and the reference features are ascertained therefrom as a point, a 2D function, a 3D function, or a 3D surface, wherein the assignment of the recording points to each other and the referencing are carried out based on reference features ascertained from stationary key structures present anyway in the three-dimensional measurement space, wherein the information provided by the 3D group of points is used directly to extract the wheel features and wherein the amount of data taken into account in the evaluation is reduced by eliminating recording points of uninteresting image regions that were recorded before the 3D group of points is ascertained from the 2D recording points.

2. The method as recited in claim 1, wherein, in addition to the wheel features, at least one key vehicle body feature is obtained in the same manner.

3. The method as recited in claim 2, wherein the determination of the wheel geometry and/or axle geometry is carried out when the motor vehicle drives past the image recording devices (2); the motion of the motor vehicle relative to the image recording devices is determined based on the at least one key vehicle body feature, and at least one wheel feature of the wheel (5) to be measured is extracted from the three-dimensional surface of the object section (6) at several or all image recording instants as the vehicle passes by.

4. The method as recited in claim 1, wherein the wheel (5) to be measured is checked in an evaluation device for rim runout with reference to at least one extracted, significant wheel feature and with reference to at least two further wheel features, and the rim runout is taken into account in a future evaluation, if necessary.

5. The method as recited in claim 1, wherein patterns are projected onto the wheel (5), the vehicle body, and/or in the three-dimensional measurement space using at least one projector.

6. The method as recited in claim 1, wherein a partially different density and/or a partially different grid is produced in the 3D group of points and/or in a three-dimensional surface model before the wheel features are extracted.

7. The method as recited in claim 1, wherein preliminary information about the vehicle body and/or wheel to be measured, is supplied to an image processing device, wherein said preliminary information includes tire diameter, rim diameter, rim shape, or a combination of tire diameter, rim diameter, and rim shape.

* * * * *